United States Patent
Georges et al.

(10) Patent No.: US 8,919,403 B2
(45) Date of Patent: Dec. 30, 2014

(54) PNEUMATIC TIRE

(75) Inventors: Francois Pierre Charles Gerard Georges, Stavelot (BE); Vincent Benoit Mathonet, Habay la Neuve (BE); Jean-Michel Alphonse Fernand Gillard, Arlon (BE); Roland Willibrord Krier, Biwer (LU); Bernard Robert Nicolas, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 842 days.

(21) Appl. No.: 12/564,945

(22) Filed: Sep. 23, 2009

(65) Prior Publication Data
US 2010/0154963 A1 Jun. 24, 2010

Related U.S. Application Data

(60) Provisional application No. 61/139,242, filed on Dec. 19, 2008.

(51) Int. Cl.
*B60C 9/18* (2006.01)
*B60C 9/28* (2006.01)

(52) U.S. Cl.
USPC ............... 152/526; 152/535; 152/538

(58) Field of Classification Search
None
See application file for complete search history.

(56) References Cited

U.S. PATENT DOCUMENTS

| | | | | |
|---|---|---|---|---|
| 3,720,569 A * | 3/1973 | Kimble | | 428/108 |
| 4,702,293 A * | 10/1987 | Iwata et al. | | 152/531 |
| 4,874,455 A * | 10/1989 | Ginter | | 156/397 |
| 4,877,073 A * | 10/1989 | Thise et al. | | 152/451 |
| 6,125,900 A * | 10/2000 | De Loze de Plaisance et al. | | 152/531 |

FOREIGN PATENT DOCUMENTS

| | | | | |
|---|---|---|---|---|
| EP | 0 501 782 A2 | 9/1992 | | B60C 9/18 |
| GB | 1 346 006 A | 2/1974 | | B60C 9/06 |

OTHER PUBLICATIONS

European Search Report—Mar. 24, 2010.

* cited by examiner

*Primary Examiner* — Justin Fischer
(74) *Attorney, Agent, or Firm* — June E. Rickey (57) ABSTRACT

A pneumatic tire is described which includes a tread, a carcass and a belt structure interposed between the carcass and the tread. The belt structure includes a pair of working belts, wherein the angle of the working belts range from about 15 degrees to about 30 degrees, wherein the belt structure further includes a zigzag belt structure located between the working belts. The zigzag belt structure is formed of at least two layers of cords interwoven together from a strip of rubber reinforced with one or more cords, wherein the strip forming the zigzag belt structure is layed up in a first zigzag winding extending from a first lateral belt edge to a second lateral belt edge in a zigzag wavelength having a first amplitude W1 followed by a second amplitude W2, and a second zigzag winding formed of a zigzag wavelength having a first amplitude W2 followed by a second amplitude W1.

16 Claims, 13 Drawing Sheets

PNEUMATIC TIRE

This application claims the benefit of and incorporates by reference U.S. Provisional Application No. 61/139,242 filed Dec. 19, 2008.

FIELD OF THE INVENTION

This invention relates to a pneumatic tire having a carcass and a belt reinforcing structure, and, more particularly, to radial ply tires for use in aircraft, trucks and other high load applications.

BACKGROUND OF THE INVENTION

Figure 1:
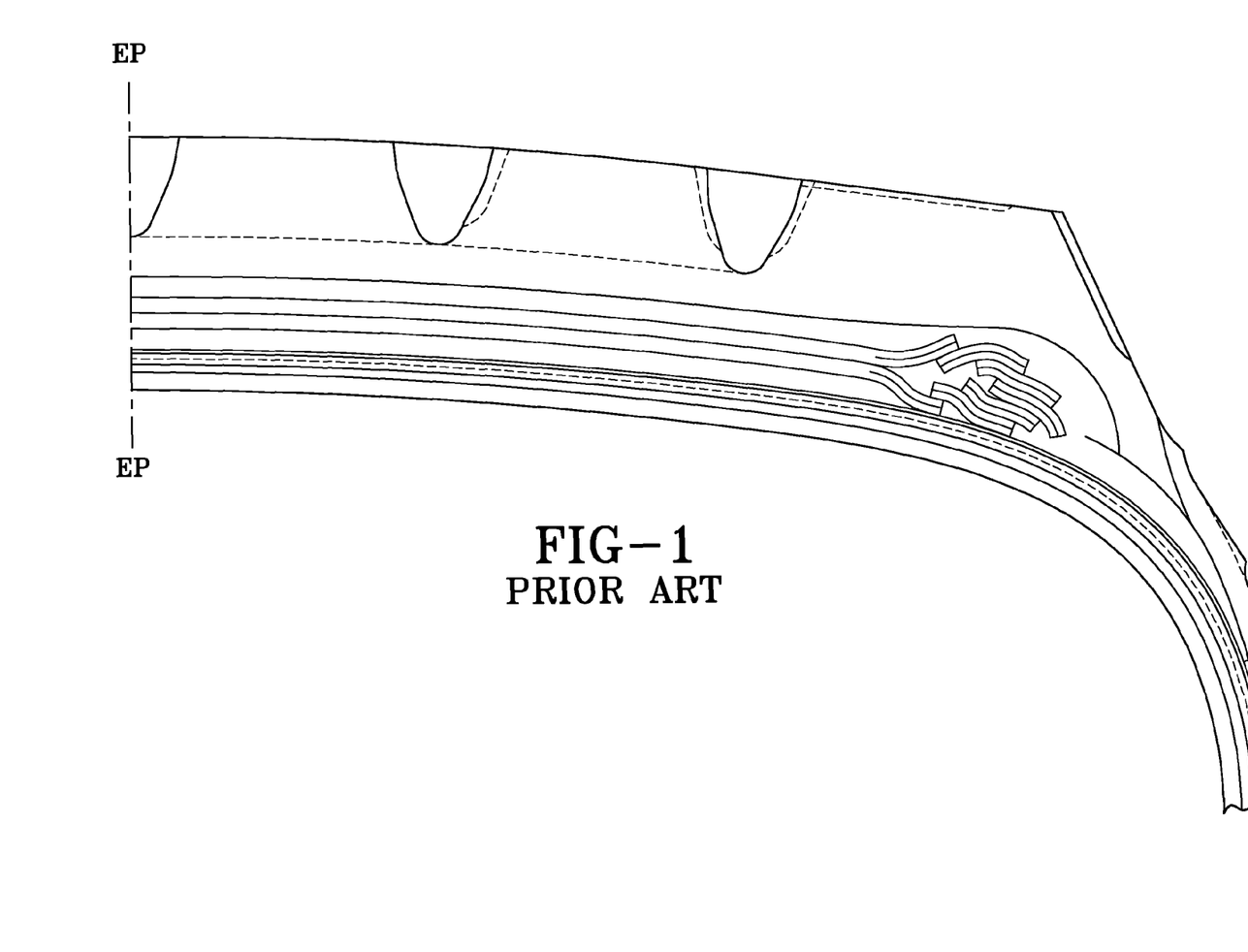
FIG. 1 is a schematic sectional view of part of a prior art tire having a zigzag belt.

In tires that have heavy loads such as truck tires or aircraft tires, zigzag belt layers have been utilized for the belt package. Zigzag belt layers eliminate cut belt endings at the shoulder. An exemplary portion of a tire with a zigzag belt layer 5 is shown in FIG. 1. The advantage of zigzag belt layers is that there are no cut belt edges near the shoulder, which greatly improves tire durability. The disadvantage to zigzag belt layers is that at the edges near the shoulder, there are overlapping layers. In some areas there are too many layers, such as 4 or more layers typically, and even 6 or more layers in some locations. The reduction of overlapping strips in the shoulder area has been shown to improve durability. Thus it is desired to have a tire with improved belt edge durability without excess weight.

SUMMARY OF THE INVENTION

The invention provides in a first aspect a pneumatic tire comprising a tread, a carcass and a belt structure interposed between the carcass and the tread. The belt structure includes a pair of working belts, wherein the angle of the working belts range from about 15 degrees to about 30 degrees, and a zigzag belt structure located between the belts. The zigzag belt structure is formed of at least two layers of cords interwoven together from a strip of rubber reinforced with one or more cords, wherein the strip forming the zigzag belt structure is layed up in a first zigzag winding extending from a first lateral belt edge to a second lateral belt edge in a zigzag wavelength having a first amplitude W1 followed by a second amplitude W2 in the opposite direction of said first amplitude. The zigzag belt structure is additionally layed up in a second zigzag winding extending from a first lateral belt edge to a second lateral belt edge in a zigzag wavelength having a first amplitude W2 followed by a second amplitude W1 in the opposite direction of said first amplitude.

The invention provides in a second aspect a pneumatic tire comprising a tread, a carcass and a belt structure interposed between the carcass and the tread. The belt structure includes a pair of working belts, wherein the angle of the working belts range from about 15 degrees to about 30 degrees, and a zigzag belt structure located between the belts. The zigzag belt structure is formed of at least two layers of cords interwoven together from a strip of rubber reinforced with one or more cords, and wherein the zigzag belt structure is formed from a first zigzag winding having a first amplitude WMax at a first lateral end and a second amplitude Wmin at a second lateral end, and WMax is greater than Wmin; and a second zigzag winding having a first amplitude Wmin at a first lateral end and a second amplitude WMax at a second lateral end, and wherein the second zigzag winding is located adjacent said first zigzag winding.

DEFINITIONS

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Bias ply tire" means a tire having a carcass with reinforcing cords in the carcass ply extending diagonally across the tire from bead core to bead core at about a 25-50 degree angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refer to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Radial-ply tire" means a belted or circumferentially-restricted pneumatic tire in which the ply cords which extend from bead to bead are laid at cord angles between 65-90 degrees with respect to the equatorial plane of the tire.

"Section height" (SH) means the radial distance from the nominal rim diameter to the outer diameter of the tire at its equatorial plane.

"Winding" means the pattern of the strip formed in a first revolution of the strip around a tire building drum, tire or core.

DETAILED DESCRIPTION OF AN EXAMPLE EMBODIMENT THE INVENTION

Figure 2A:
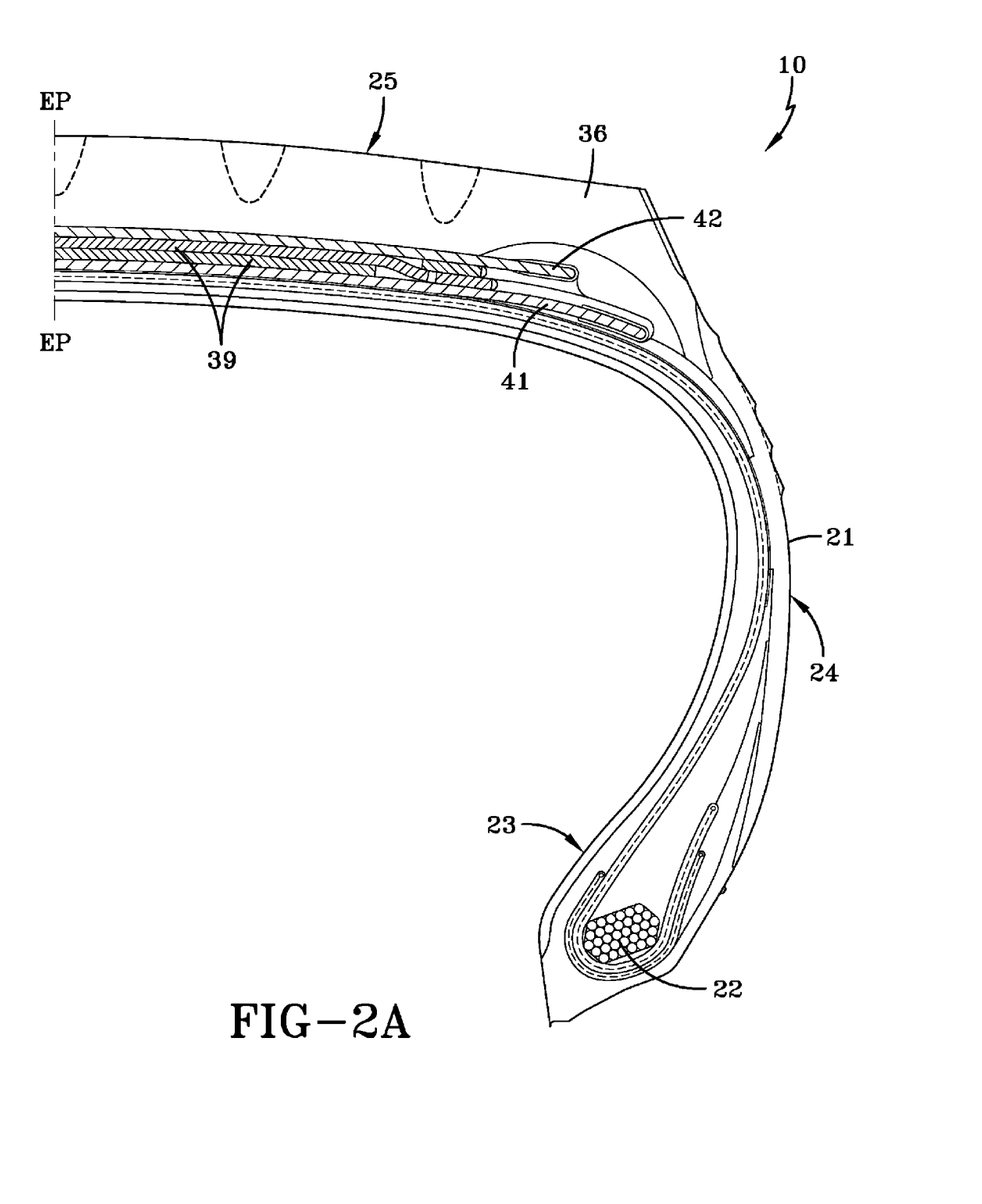
FIG. 2A illustrates a partial cross-section of an exemplary radial tire 10 of the present invention.
Figure 2B:
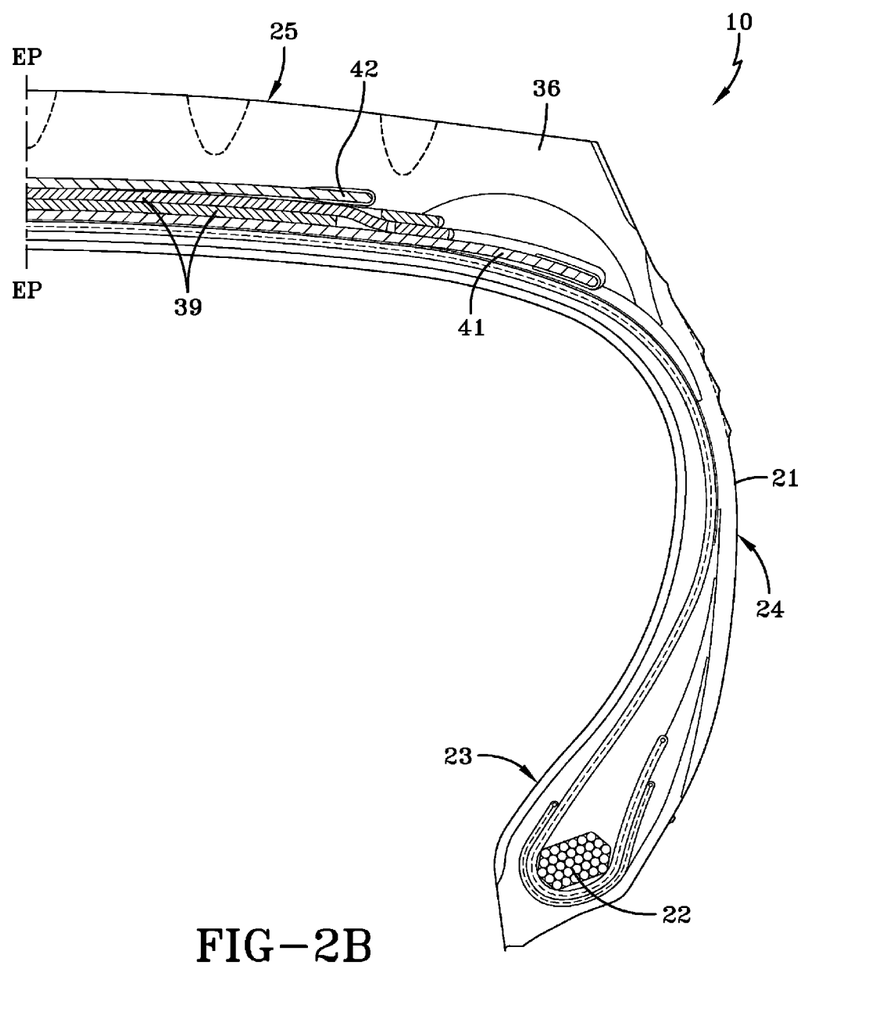
FIG. 2B illustrates a partial cross-section of a second embodiment of a radial tire 10 of the present invention.

FIG. 2 illustrates a partial cross-section of an exemplary radial tire 10 which includes a bead portion 23 having a bead core 22 embedded therein, a sidewall portion 24 extending radially outward from the bead portion 23, and a cylindrical tread portion 25 extending between radially outer ends of the sidewall portions 24. The tire 10 is reinforced by a carcass 31 toroidally extending from one bead portion 23 to the other bead portion 23' (not shown). The carcass 31 may include at least one carcass ply 32. The carcass ply 32 is anchored to the bead core and for example, may wind around each bead core 22 from inside of the tire 10 away from the equatorial plane EP to form turnup portions. A belt reinforcement package 40 is arranged between the carcass 31 and the tread portion 25.

The belt reinforcement package 40, according to an example embodiment of the present invention, includes a pair of working belts, 41, 42. Belt 41 is located radially inwards of 42. Belt 41 has a width which is about equal to the tread arc width. Preferably, belt 41 has a belt width substantially equal to the tread arc width. The breaker angle of belt 41 is between about 16 and 30 degrees, preferably with a left orientation, more preferably in the range of about 19 to about 25 degrees. The belt angles are measured with respect to the circumferential direction. Belt 41 is preferably made of steel having a 4+3x0.35 construction. The % elongation at 10% of breaking load may range from about 0.18 to about 0.26, and more preferably greater than 0.2. The % elongation is measured on a cord taken from a vulcanized tire. The % elongation at 10% of breaking load for a bare, green cord may range from about 0.2% to about 0.27%.

Belt 42 is the second member of the working belt pair. Belt 42 has a width less than the width of belt 41 (the other working belt), and is preferably radially outward of belt 41. As shown in FIGS. 2A and 2B, belt 42 may have a width which ranges from about 60% to about 88% of the tread arc width. In FIG. 2A, the belt 42 has a greater width than the zigzag belt 39, while in FIG. 2B, the belt 42 has a width less than the zigzag belt. Belt 42 has a breaker angle between about 16 and 30 degrees, preferably with a right orientation, more preferably in the range of about 19 to about 25 degrees. Belt 42 is preferably made of the same wire as belt 41, having the same construction with the same but opposite angular orientation as 41.

The belt structure 40 further comprises a zigzag belt structure 39 which is located between the working belts 41, 42. The zigzag belt 39 may be formed from using any of the zigzag patterns as described below. Preferably, the zigzag belt structure has 0.5 zigzag wave per drum revolution or 1 zigzag wave per drum revolution. The belt width of the zigzag belt is preferably in the range of about 70% to about 80% of the tread arc width, and even more preferably in the range of 73-77%. The zigzag belt 39 may be steel formed in a high elongation construction such as, for example, 3x7x0.22 HE, and having an EPI of about 14. The high elongation wire may have a % elongation at 10% of the breaking load ranging from about 1.7-2.05% for a bare, green cord. The high elongation wire may have a % elongation at 10% of the breaking load ranging from about 0.45-0.68% taken from cured tire. Another example of a cord construction suitable for the invention is made of steel having a 4x7x0.26 HE construction, with an EPI of 18.

Alternatively, the zigzag belt may be formed of aramid, having a 1670/3 construction with a density of 24 EPI (ends per inch). The aramid may also have a 3300/3 construction with an EPI of 24. The % elongation at 10% of breaking load for a bare cord typically is 0.98%.

It is preferred that the zigzag belt be formed of a cord having a rigidity or stiffness which is defined as follows. The rigidity is analogous to a spring having an equation $F=KX$, wherein F is the force by unit of the transversal width of the strip (N/inch); K is the rigidity of force per transverse width divided by the % elongation in the longitudinal direction, (N/inch) and X is the relative % relative elongation in the longitudinal direction. Thus on a plot of force/transverse width vs. % relative elongation, the rigidity would equal the slope of the curve. It is desired to select a cord and cord density in the transversal direction (EPI) providing a strip rigidity in the range of about 300,000 N/inch to about 800,000 N/inch, and more preferably in the range of about 350,000 to about 750,000 N/inch. The cord properties as described above are measured using a cord taken from a cured tire.

The aspect ratio of the tire described above may vary. The aspect ratio is preferably in the range of about 50 to about 90. The tire may have a net to gross ratio in the range of about 70 to about 90, more preferably in the range of about 74 to about 86, more preferably about 78 to 84.

Zigzag Belt Construction

Figure 3:
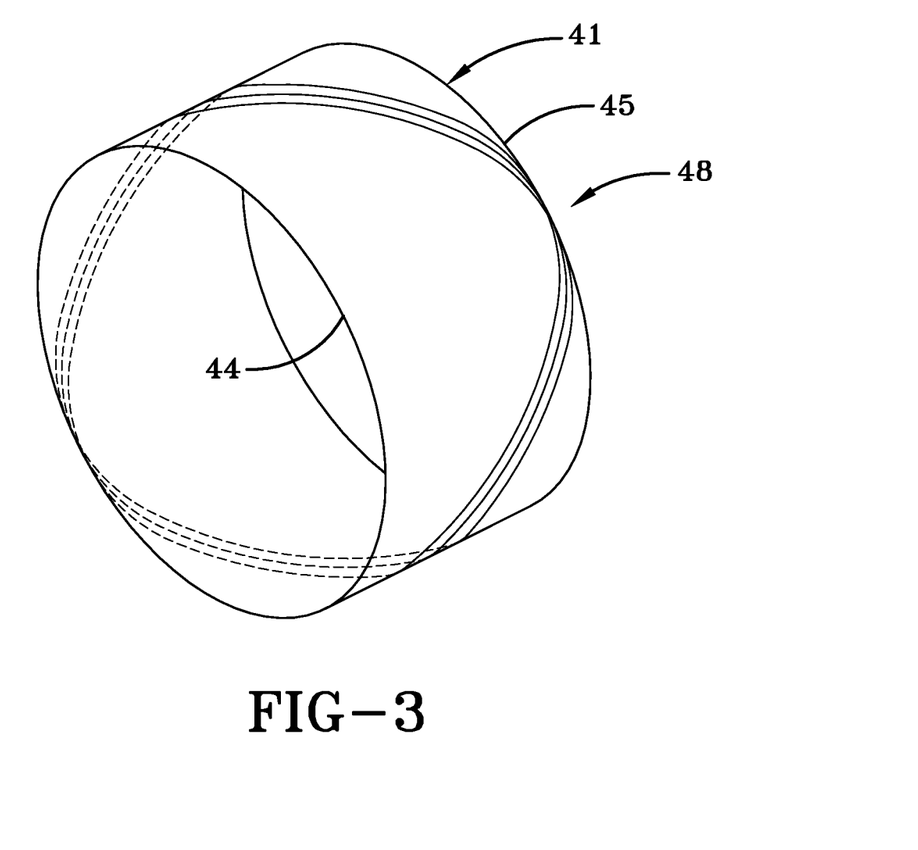
FIG. 3 is an example of a tire building drum showing the belt of the present invention being formed.

FIG. 3 illustrates a tire building drum 48 having axial circumferential edges 44, 45. In order to form the modified zigzag belt structure 39 on the tire building drum, the tire building drum is rotated as a rubberized strip 43 of cord is wound around the drum in a generally circumferential direction, extending in an alternating fashion from one drum edge 44 to the other drum edge 45.

Figure 4A:
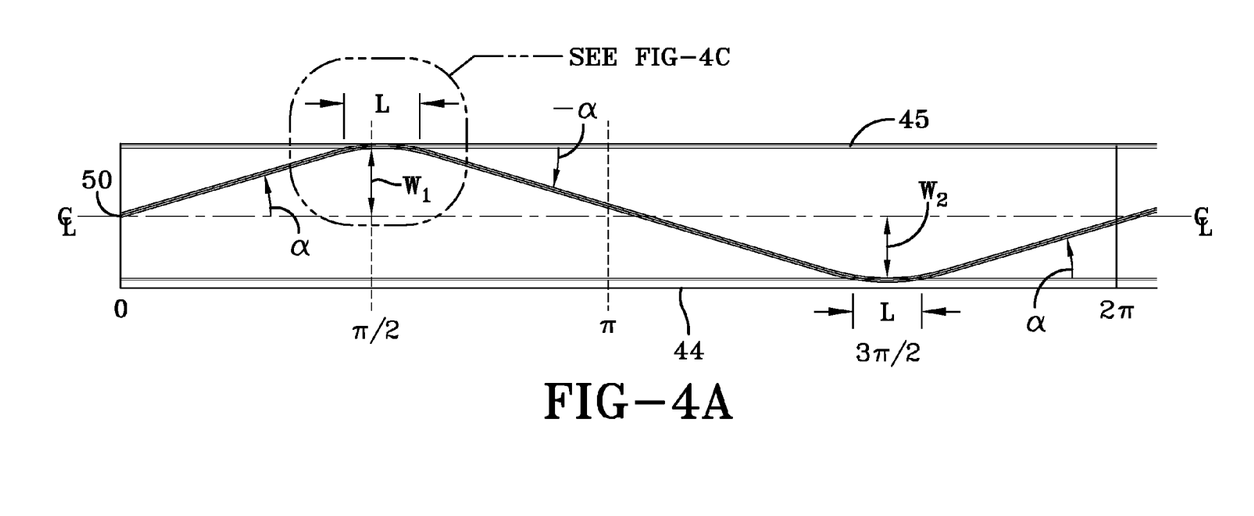
FIG. 4A is an example of a tire building drum layed out circumferentially for illustration purposes illustrating a first full revolution of the strip layup forming the zigzag belt.
Figure 4B:
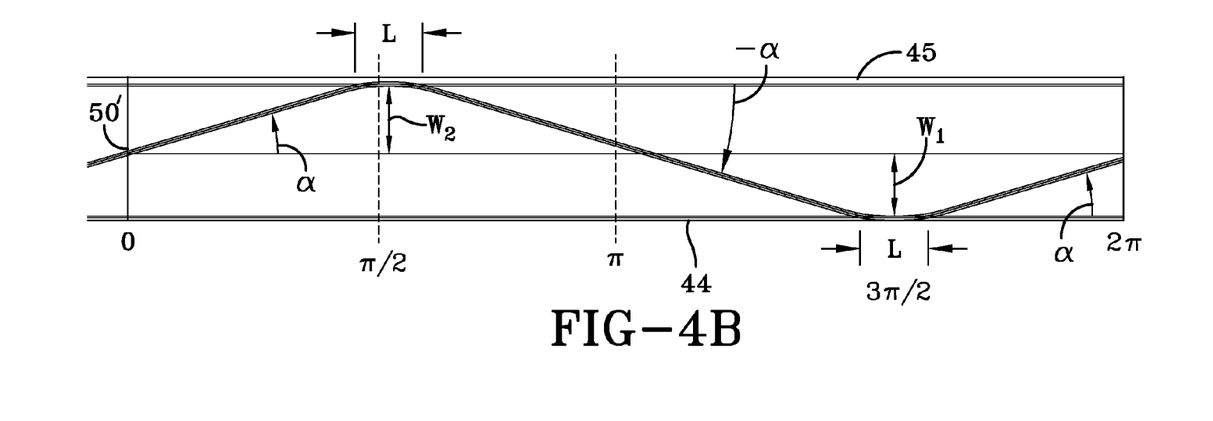
FIG. 4B is the tire building drum of FIG. 4A illustrating only a second revolution of the cord pattern of the zigzag belt (the first revolution was removed for clarity)
Figure 4C:
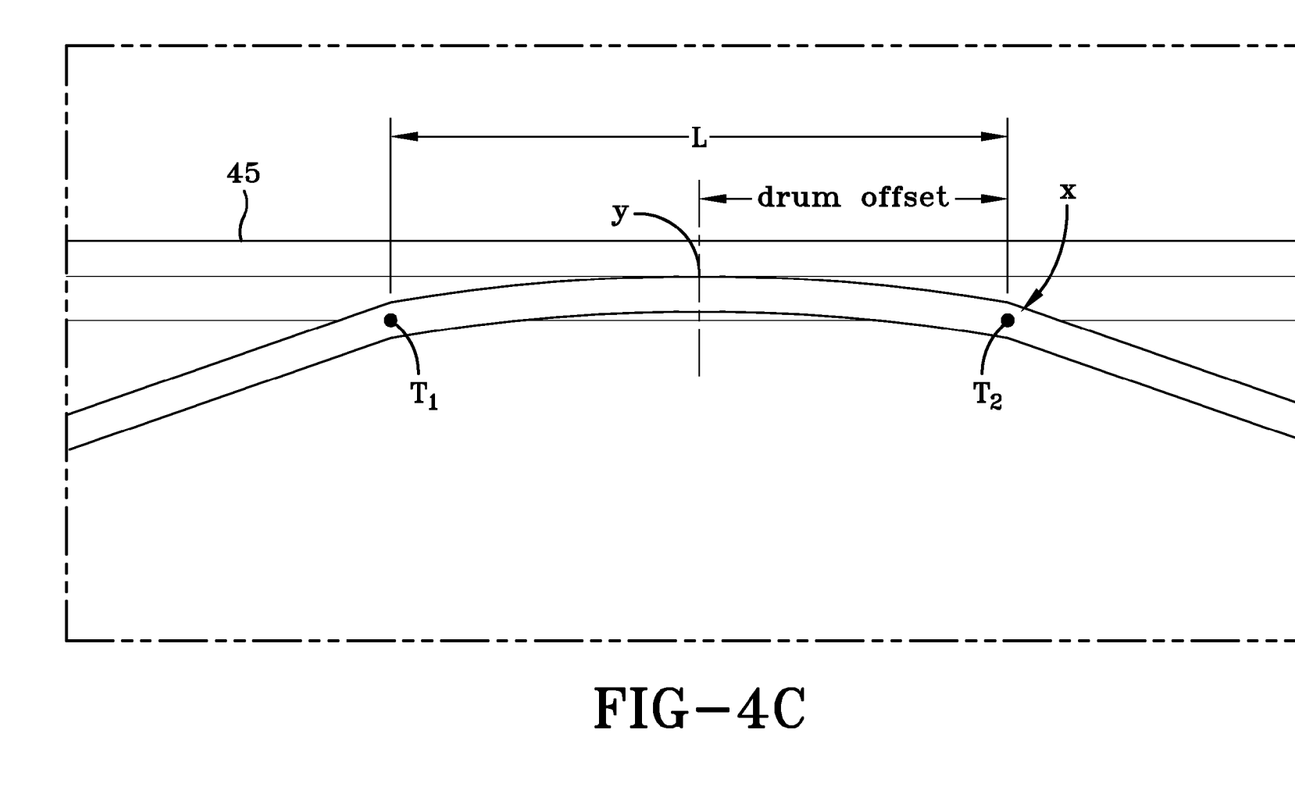
FIG. 4C is a closeup view of the strip at the belt edge undergoing a U turn.

FIGS. 4*a* and 4*b* illustrate the tire building drum wherein the circumference of the drum is laid out flat, from 0 radians (degrees) to 2π radians (360 deg). FIG. 4*a* illustrates a first winding for a first drum revolution of the zigzag belt being formed on the drum. The invention may also be formed on a core or tire, and is not limited to being formed on a tire building drum. For illustration purposes, the initial starting point 50 will be the mid-circumferential centerplane of the drum at 0 radians, however any starting point location may be used. The strip is first angled at an angle α to the edge 45 of the tire building drum. This correlates to a location of about π/2 radians for 1 zigzag per revolution. The following description illustrates the pattern for 1 zigzag wave per revolution, and is not limited to same, as the zigzag wave per revolution may vary as desired. At the edge 45 of the tire building drum, the strip has a first axial width or amplitude $W_1$, as measured from the center or mid-circumferential plane of the drum. $W_1$ is preferably the maximum axial width located near the edge of the drum. Next, the strip may optionally continue for a distance L in a circumferential (0 degree) direction at the edge 44. As shown in FIG. 4*c*, the strip is preferably U turned without sharp angles, and preferably is radiused at the transition points T1 and T2. As shown in FIG. 4A, the strip is then angled at—α towards the opposite drum edge 44. At about 3/2π radians, the strip has a second axial width or amplitude $W_2$, which is measured from the centerplane, and is different than $W_1$. $W_1$ is preferably greater than $W_2$. Thus the strip does not extend completely to the axial end 44 of the drum. Next, the strip may be optionally oriented in a substantially circumferential direction (0 degrees) for a circumferential distance L. Finally, the strip is angled towards the mid-circumferential centerplane at an angle α. The strip reaches the mid-circumferential centerplane at about 2π radians.

The layup of the strip for a second winding is shown in FIG. 4*b*. For the sake of clarity, the first winding has been removed. The starting point 50' of the second winding has been axially indexed a desired amount, depending upon the amount of gap between successive strips desired. For illustration purposes, the second winding of the strip is indexed a strip width so it abuts with the first winding. Starting at 50', the strip is first angled at an angle α to the edge 45 of the tire building drum. This correlates to a location of about π/2 radians for 1 zigzag per revolution. At this location, the strip has an axial width or amplitude $W_2$, as measured from the center or mid-circumferential plane of the drum. Next, the strip may optionally continue for a distance L in a circumferential (about 0 degrees) direction at the edge 44. As shown in FIG. 4*c*, the strip is preferably turned at the drum edge without sharp angles, and preferably is radiused at the transition points T1, T2. As shown in FIGS. 4*b* and 4C, the strip is then angled from the transition point T2 at—α towards the opposite drum edge 44. At about 3/2π radians, the strip has an axial width or amplitude $W_1$. Next, the strip may optionally be oriented in a circumferential direction (about 0 degrees) for a circumferential distance L. As shown in FIG. 4C, the strip is preferably turned at the drum edge without sharp angles, and preferably is radiused at the transition points T1, T2. Finally, the strip is angled towards the mid-circumferential centerplane at an angle α. The strip reaches the mid-circumferential centerplane at 2π radians.

Thus in a first strip winding, the strip traversed from the starting point to a first amplitude $W_1$, then to a second amplitude $W_2$, and then back to the starting point. W1 and W1 are in opposite directions from the centerplane, and $W_1 \neq W_2$, and preferably $W_1 > W_2$. Then in a second strip winding, the strip traversed from an indexed starting point to a first amplitude $W_2$, then to a second amplitude $W_1$, and then back to the starting point. Thus the strip windings preferably abut, but may also be overlapped or be spaced apart. The strip may also be offset circumferentially at the edges, alone, or in combination with the variable amplitude zigzag pattern.

A second embodiment of the invention is as described above, except for the following differences. If there are N revolutions required to form the zigzag belt structure, then the first N/2 revolutions, each zigzag winding has a pattern of W1–W2. For the second half (N/2) revolutions, each zigzag winding has a pattern W2–W1, wherein W1 and W2 extend in opposite directions from the centerplane, and $W_1 \neq W_2$. Preferably $W_1 > W_2$.

Figure 5A:
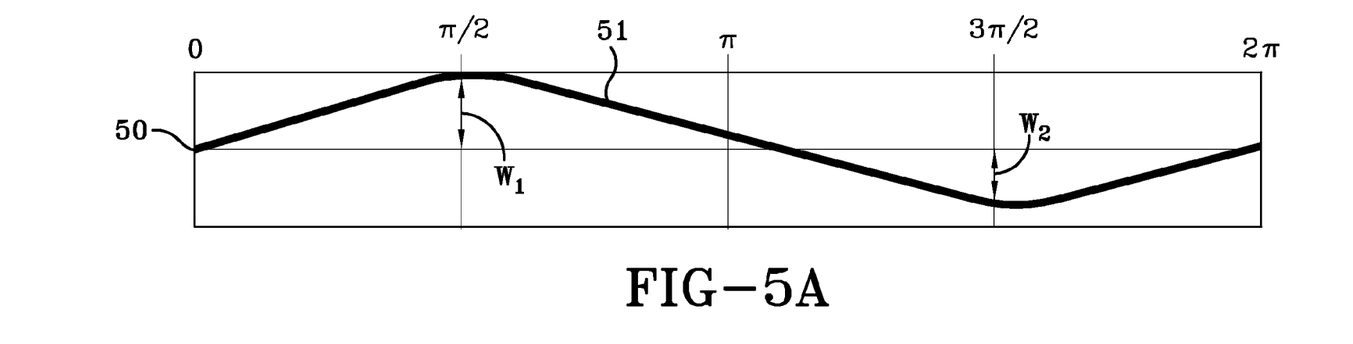
FIG. 5A is an example of a tire building drum layed out circumferentially for illustration purposes illustrating a first full revolution or first winding of the strip layup forming the zigzag belt.
Figure 5B:
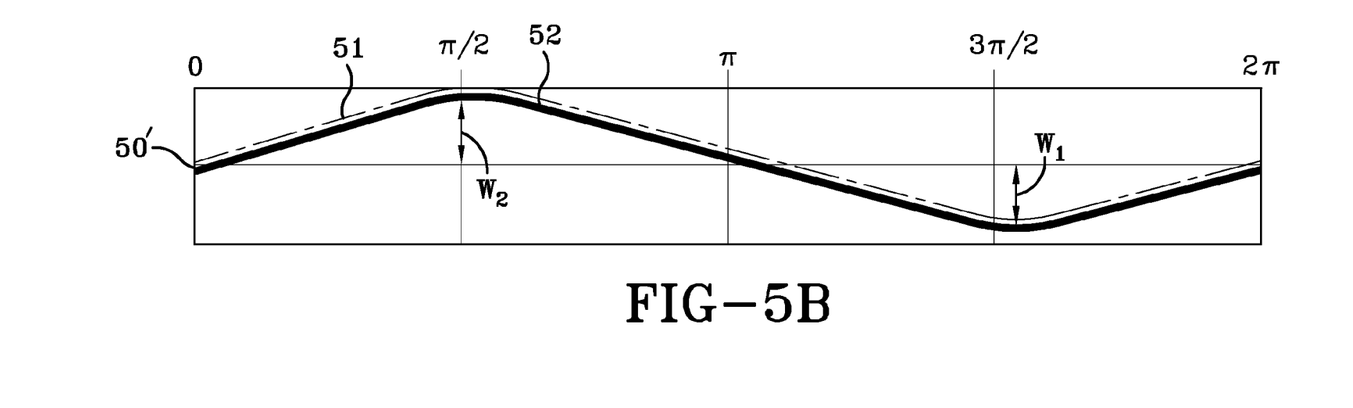
FIG. 5B is the tire building drum of FIG. 5A illustrating the second revolution of the drum showing the first and second winding of the strip layup forming the zigzag belt.

A third embodiment of the invention is now described. FIG. 5A illustrates a first winding of the strip having a first amplitude W1 followed by a second amplitude W2 in the opposite direction. FIG. 5B illustrates a second winding of the strip wherein the strip has a first amplitude W2 followed by a second amplitude W1 in the opposite direction. The second winding has been indexed a desired distance from the first winding, and thus may abut (as shown), overlap or be spaced apart.

Figure 5C:
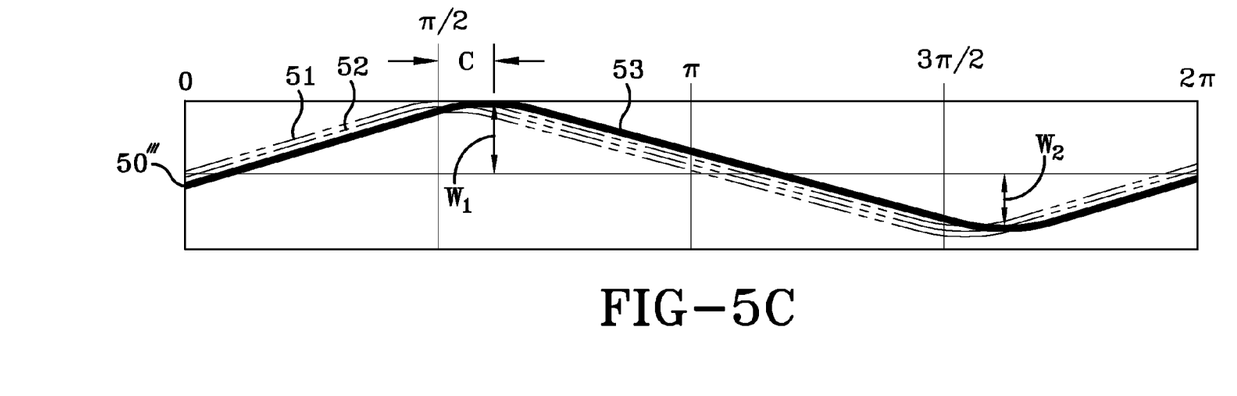
FIG. 5C is the tire building drum of FIG. 5A illustrating the third revolution of the drum showing the first, second and third winding of the strip layup forming the zigzag belt.
Figure 5D:
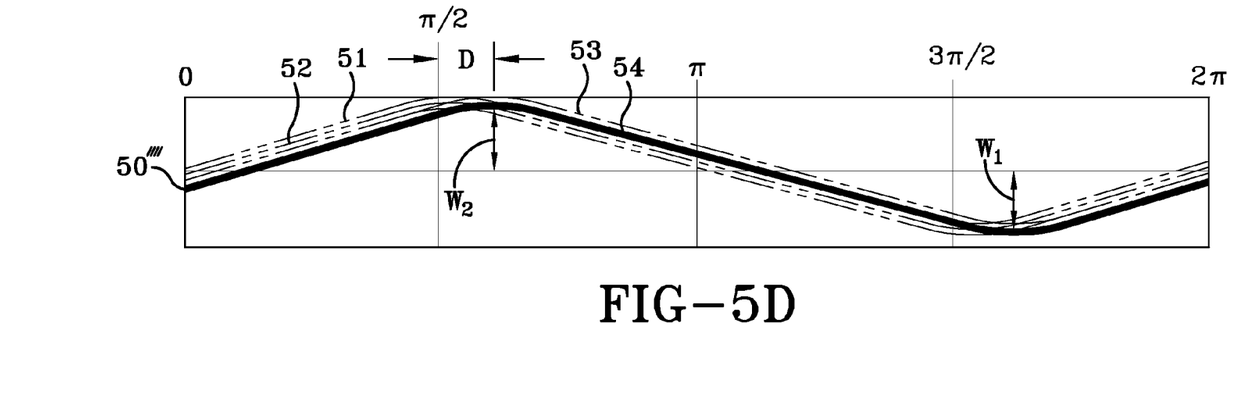
FIG. 5D is the tire building drum of FIG. 5A illustrating the fourth revolution of the drum showing the first, second, third and fourth winding of the strip layup forming the zigzag belt.

FIG. 5C illustrates a third winding of the strip, wherein the strip winding has been circumferentially shifted or offset from the previous two windings of strip, so that the turn at the edge is offset from the edges of the previous windings. Just past the π/2 location an offset distance C, the strip has a W1 amplitude and a W2 amplitude just past the 3π/2 location. FIG. 5D illustrates a fourth strip winding, wherein the strip is also circumferentially offset from the first, second windings, in order to reduce the belt strip gauge at the outer belt edge. As shown, just past the π/2 location at an offset distance D, the strip has a first amplitude W2 and a second amplitude W1 at an offset distance D. The offset distance D is different than the offset distance C. Preferably, the offset distance D is less than the offset distance C. In order to form the complete belt layer, the sequence as described is repeated until the belt layer is formed.

Figure 6:
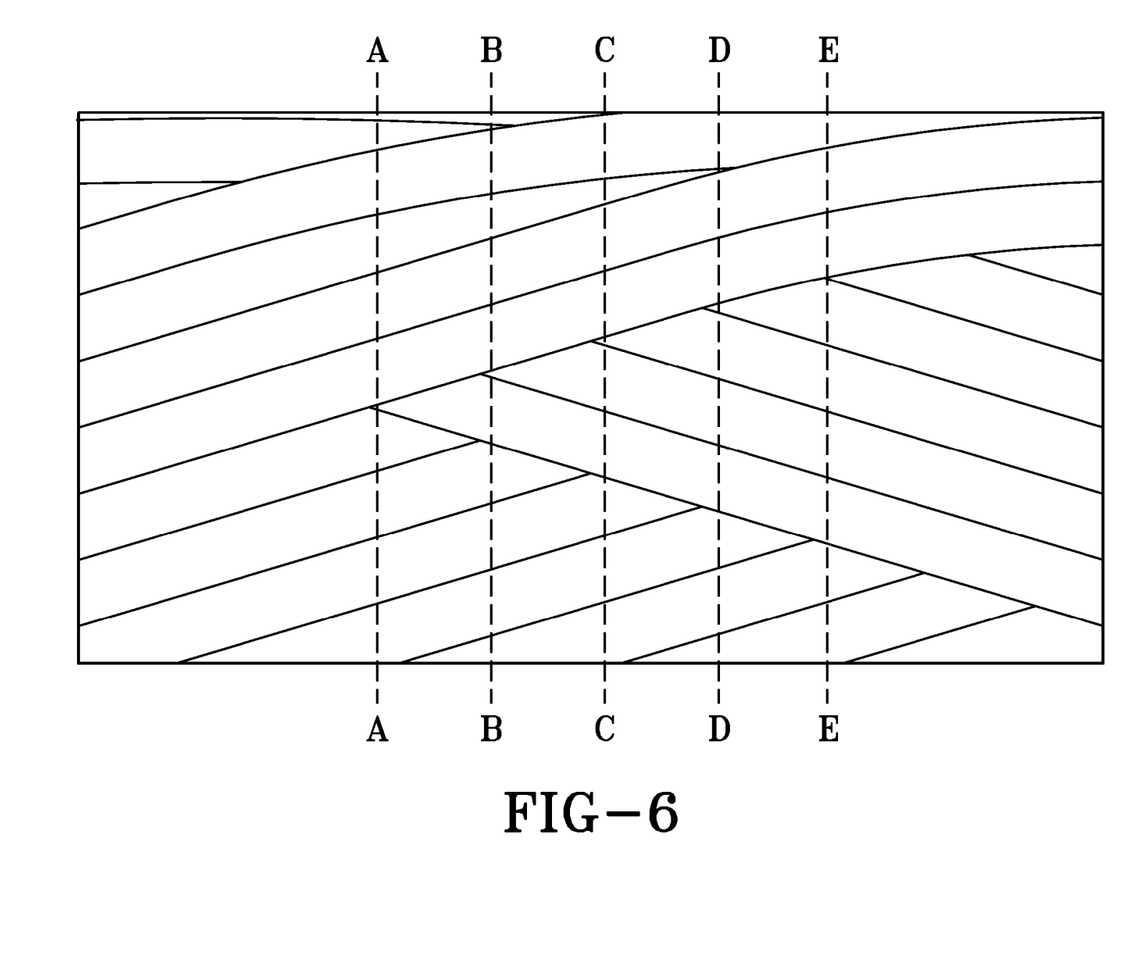
FIG. 6 illustrates the zigzag belt edge.
Figure 7:
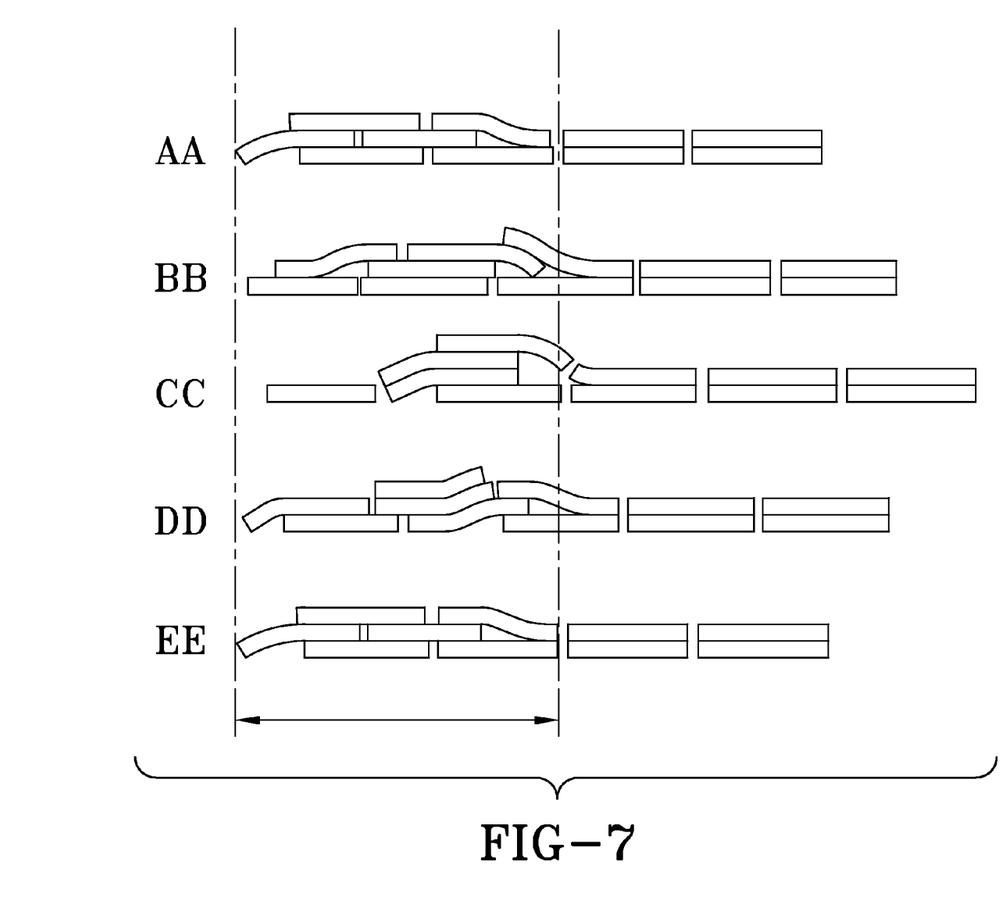
FIG. 7 illustrates a cross-sectional view of the zigzag belt edge at sections A-A, B-B, C-C, D-D and E-E showing the estimated overlap of layers.
Figure 8:
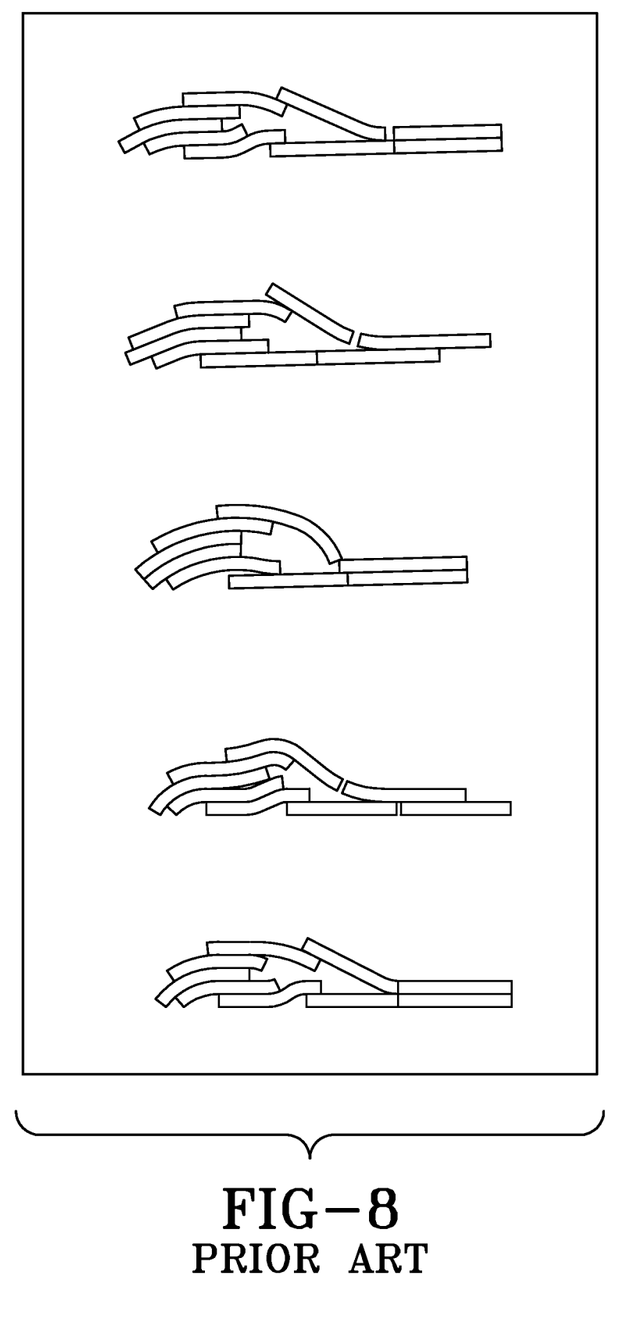
FIG. 8 illustrates a cross-sectional view of the zigzag belt edge at sections A-A, B-B, C-C, D-D and E-E showing the estimated overlap of layers for the prior art zigzag belt of FIG. 1.

FIG. 6 illustrates a 1 zigzag wave per revolution belt in the area near the belt edge having multiple layers of strips. FIG. 7 illustrates the cross-sectional views of the belt edge taken at various locations A-A through E-E. As shown, the amount of strip overlap varies from about one layer to a maximum of 4 layers in section C-C. FIG. 8 illustrates the prior art zigzag belt layup where there are up to 6 layers overlapping each other. Thus the belt configuration of the present invention has reduced the number of overlapping layers which are believed to reduce tire durability.

The strip is formed of a rubberized ribbon of one or more cords. The width of the strip may vary, and may be for example, about 5-14 mm wide, and more preferably about 10-13 mm wide. The cord reinforcements may be formed of nylon, polyester, aramid or steel. All of the above exemplary embodiments were illustrated with 1 zigzag wave per 1 drum revolution. The invention may also include N zigzag waves per 1 drum revolution, wherein N is 0.25 or greater. N may also be an integer ≥1. For example, the strip may be layed up so that one full zigzag wave occurs in 2 full drum revolutions, or ½ zigzag per revolution. The invention as described above may also abut the strips, thus having no gap in spacing of consecutive windings. Alternatively, the successive winding of strips may be overlapped from about 1% to about 100% of the strip width. Alternatively, the successive winding of strips may have a gap distance G formed therebetween. G may vary from about 1% to about 100% of the strip width.

Figure 9A:
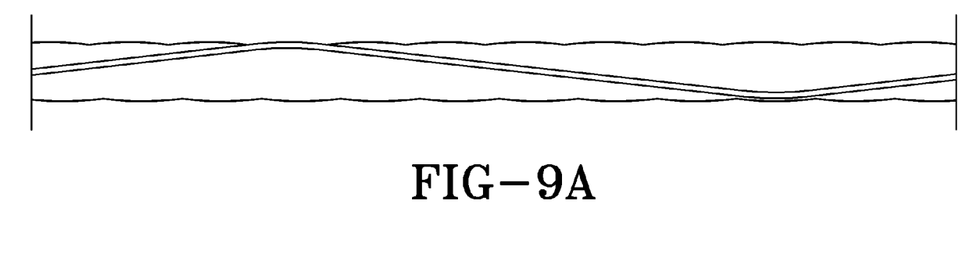
FIGS. 9A-9C illustrate a zigzag belt having a traverse offset of 0.1 mm, and wherein the drum offset angle is varied from 6.75 deg shown in FIG. 9A, to 13.5 deg shown in FIG. 9B, and 27 deg shown in FIG. 9c.
Figure 9B:
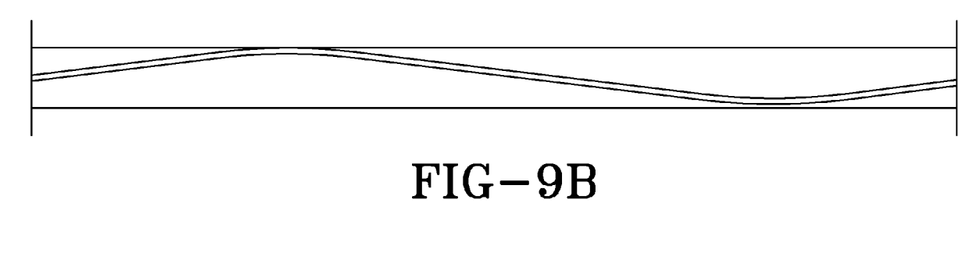
Figure 9C:
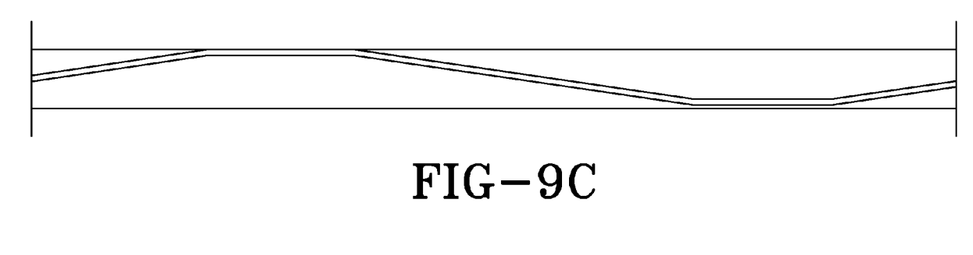

Another variable which may be utilized is the drum offset, which is best shown in FIG. 4*c*. The drum offset is the circumferential distance of the drum (measured in degrees or radians) from the strip edge at point Y to point X. In other words, the drum offset is half the circumferential distance over which the strip does a U-turn, as measured from the point Y closest to the edge, to the point X where the turn is completed. The drum offset or turning distance can be varied, effectively elongating the edge in the circumferential direction if increased, or resulting in a sharper turning angle if decreased. For example, the drum offset may range from about 5 degrees to about 30 degrees, and more preferably from about 10 to about 16 degrees. As the drum offset increases, the angle of the strip a also increases. FIGS. 9A-9C illustrates a strip layed upon the drum in a 1 zigzag per drum revolution. FIG. 9A illustrates a drum offset of 6.75 degrees, resulting in an $\alpha$ of 6.65 degrees. FIG. 9B illustrates a drum offset of 13.5 degrees, resulting in an $\alpha$ of 7.22 degrees. FIG. 9C illustrates a drum offset of 27 degrees, resulting in an $\alpha$ of 8.76 degrees. As can be seen from a review of all of the figures, as the drum offset distance is increased, the angle at the turnaround elongates along the edge and results in a smoother pass. The increase in drum offset also results in a slighter higher $\alpha$. As the drum offset is increased, the amount of overlap of layers of the strip increases from 2.83 in FIG. 9A, to 3.87 in FIG. 9B, and over 6 in FIG. 9C.

Figure 10A:
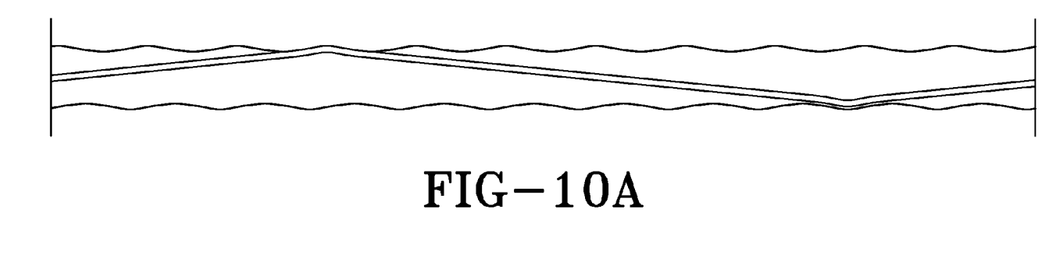
FIGS. 10A-10C illustrate a zigzag belt having a traverse offset of 8 mm, and wherein the drum offset angle is varied from 6.75 deg shown in FIG. 10A, to 13.5 deg shown in FIG. 10B, and 27 deg shown in FIG. 10C.
Figure 10B:
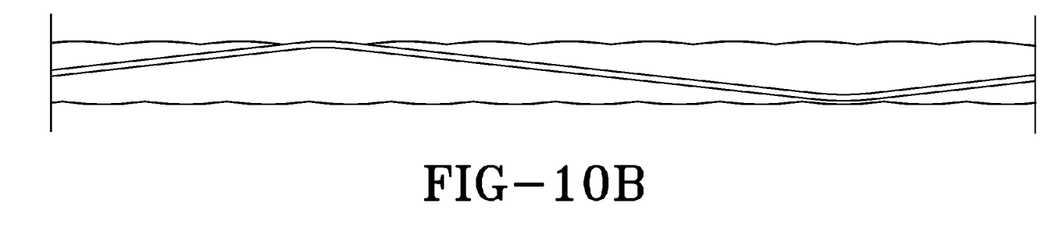
Figure 10C:
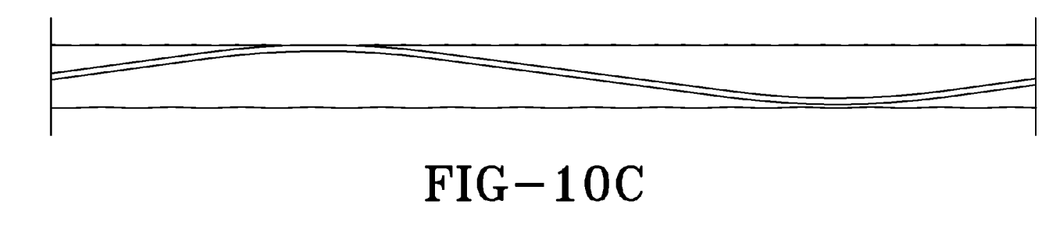

Another variable which may be utilized is the traverse offset. The traverse offset is the axial distance of the belt edge from the edge of the drum edge, in mm. By increasing the traverse offset, the strip starts to turn earlier, and can result in uneven belt edges as shown in FIGS. 10a and 10b, as compared to FIGS. 9a and 9b. FIGS. 10A-10C illustrate an 8 mm traverse offset. FIG. 10A illustrates a drum offset of 6.75 degrees, resulting in an a of 5.96 degrees. FIG. 10B illustrates a drum offset of 13.5 degrees, resulting in an $\alpha$ of 6.48 degrees. FIG. 10C illustrates a drum offset of 27 degrees, resulting in an $\alpha$ of 7.18 degrees. The effect of decreasing the traverse offset results in a belt with more even or smoother edges and a slight reduction in the circumferential angle $\alpha$ in the strip.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising a tread, a carcass and a belt structure interposed between the carcass and the tread, wherein the belt structure includes a pair of working belts, wherein the angle of the working belts range from about 15 degrees to about 30 degrees, wherein the working belts have a % elongation at 10% of the breaking load in the range of 0.18 to about 0.26, wherein the belt structure further includes a zigzag belt structure located radially between the working belts, the zigzag belt structure is formed of at least two layers of cords interwoven together from a strip of rubber reinforced with one or more cords, wherein the strip forming the zigzag belt structure is layed up in a first zigzag winding extending from a first lateral belt edge to a second lateral belt edge in a zigzag wavelength having a first amplitude W1 immediately followed by a second amplitude W2 in the opposite direction of said first amplitude, wherein the strip forming the zigzag belt structure is layed up in a second zigzag winding immediately following the first winding, wherein the strip extends from a first lateral belt edge to a second lateral belt edge in a zigzag wavelength having a first amplitude W2 immediately followed by a second amplitude W1 in the opposite direction of said first amplitude, wherein W1≠W2, wherein the zigzag belt structure is formed of a cord having a % elongation at 10% of breaking load greater than 0.45%, when taken from wire from a cured tire.

2. The pneumatic tire of claim 1 wherein the second zigzag winding abuts said first zigzag winding.

3. The pneumatic tire of claim 1 wherein the first and second zigzag windings each have turns at the first and second lateral edges, wherein the strips at each edge are extended in a circumferential direction for a distance L.

4. The pneumatic tire of claim 1 wherein the first zigzag winding is alternated with the second zigzag winding.

5. The pneumatic tire of claim 1 wherein the first zigzag winding is not alternated with the second zigzag winding.

6. The pneumatic tire of claim 1 wherein the belt at each edge is radiused.

7. The pneumatic tire of claim 1 wherein the belt at each edge extends in a substantially circumferential direction for a specified distance L.

8. The pneumatic tire of claim 1 wherein the zigzag belt structure has a first belt edge in a first winding, and a second belt edge in a second winding, wherein the first belt edge is circumferentially offset from the second belt edge.

9. The pneumatic tire of claim 1 wherein the zigzag belt structure has N zigzag waves per winding wherein N is ≤1.

10. The pneumatic tire of claim 1 wherein the zigzag belt structure has N zigzag waves per winding, wherein N is ≥0.25.

11. The tire of claim 1 wherein the radially inner working belt has a width about equal to the tread arc width.

12. The tire of claim 1 wherein the radially outer working belt has a width less than the radially inner working belt.

13. The tire of claim 1 wherein the radially inner working belt is the widest belt of the belt reinforcement structure.

14. The tire of claim 1 wherein the zigzag belt has a width of about 75% of the tread arc width.

15. The tire of claim 1 wherein the zigzag belt is the narrowest belt.

16. The tire of claim 1 wherein the zigzag belt has a width in the range of about 0.5 to about 0.75* tread arc width.

* * * * *